(12) United States Patent
Richards et al.

(10) Patent No.: US 7,715,994 B1
(45) Date of Patent: May 11, 2010

(54) PROCESS FOR USING SURFACE STRAIN MEASUREMENTS TO OBTAIN OPERATIONAL LOADS FOR COMPLEX STRUCTURES

(75) Inventors: William Lance Richards, Palmdale, CA (US); William L. Ko, Lancaster, CA (US)

(73) Assignee: The United States of America as represented by the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/191,734

(22) Filed: Aug. 14, 2008

(51) Int. Cl.
*G01L 1/00* (2006.01)

(52) U.S. Cl. .................................................. 702/42
(58) Field of Classification Search ................ 702/42; 385/12
See application file for complete search history.

(56) References Cited

U.S. PATENT DOCUMENTS

| 6,795,599 B2 * | 9/2004 | Spirin et al. ............. 385/12 |
| 2008/0011091 A1 * | 1/2008 | Weldon, Jr. ............. 73/766 |

\* cited by examiner

*Primary Examiner*—Aditya Bhat
(74) *Attorney, Agent, or Firm*—Mark Homer

(57) ABSTRACT

The invention is an improved process for using surface strain data to obtain real-time, operational loads data for complex structures that significantly reduces the time and cost versus current methods.

10 Claims, 4 Drawing Sheets

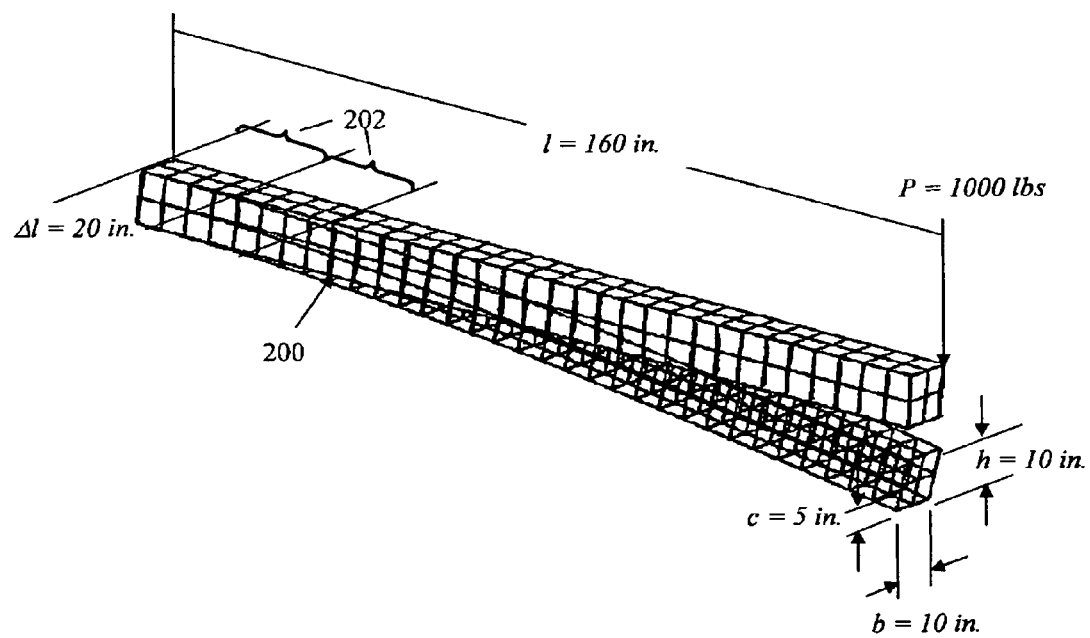
Figure 2. Cantilever beam of constant cross section subjected to tip loading.

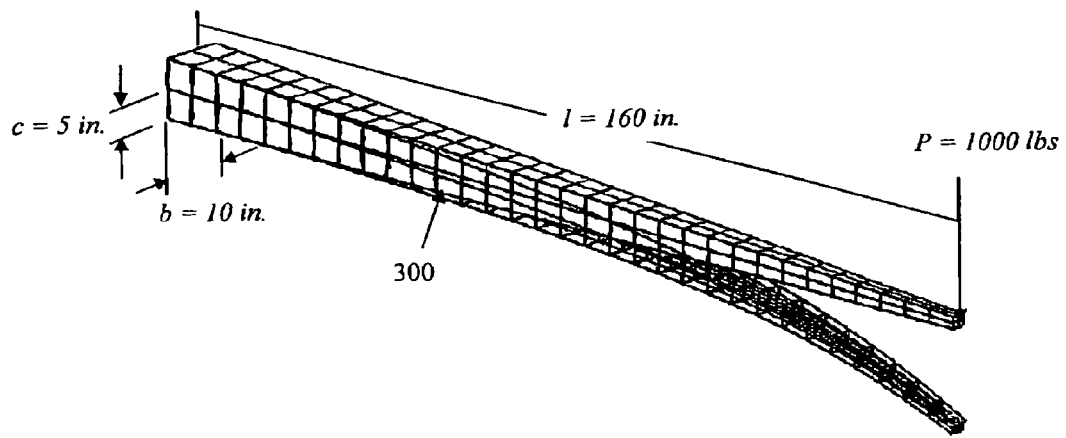
Figure 3. Cantilever beam of tapered cross section subjected to tip loading.
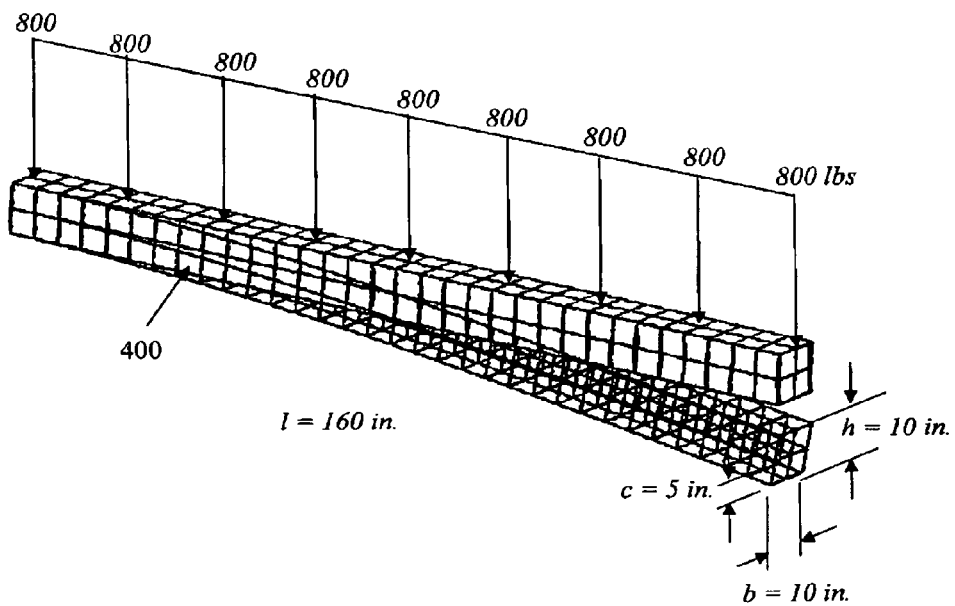
Figure 4. Cantilever beam of constant cross section subjected to distributed loading.

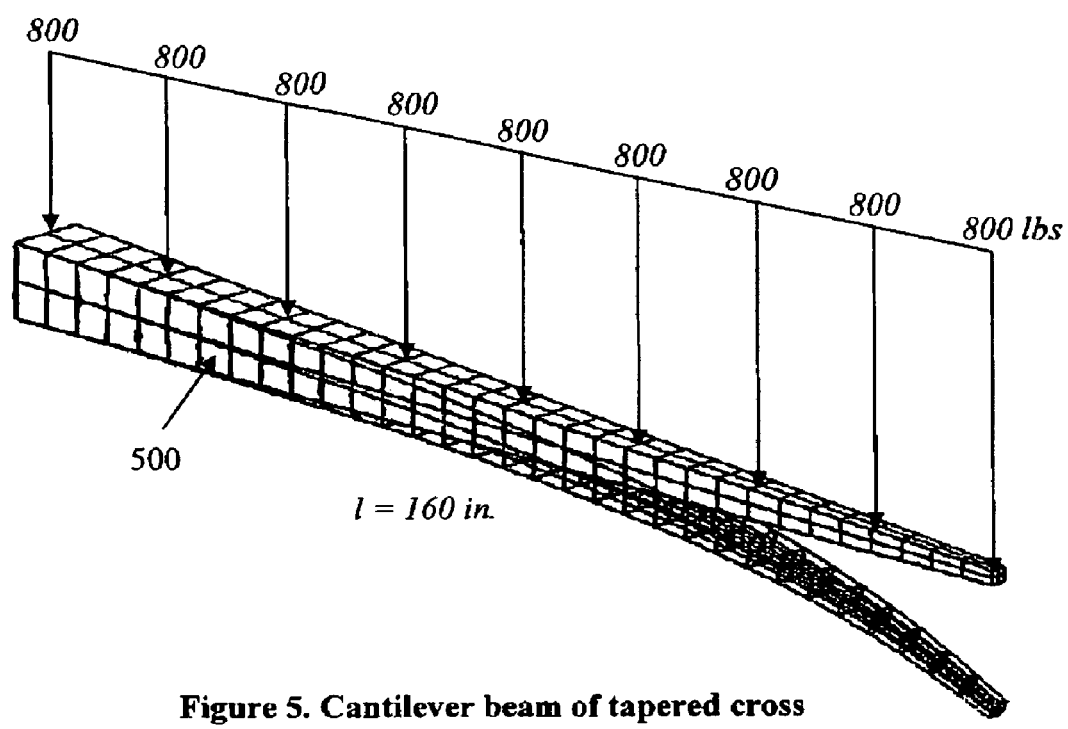
Figure 5. Cantilever beam of tapered cross section subjected to distributed loading.

PROCESS FOR USING SURFACE STRAIN MEASUREMENTS TO OBTAIN OPERATIONAL LOADS FOR COMPLEX STRUCTURES

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to processes to obtain externally applied, out-of-plane operational load data using surface in-plane strain measurements on complex structures, particularly to real-time methods to calculate operational loads for complex structures, and most particularly an ultra-efficient process of calculating externally applied bending and torsional operational loads in real-time on complex structures using strain measurements provided by fiber Bragg grating technology.

An important by-product of this process is the efficient characterization of out-of-plane bending and torsional stiffness (material properties) of the complex structure.

2. Description of the Related Art

Currently, to obtain operational load data for complex structures, industry uses a very rigorous and time consuming design methodology that relies heavily on computational methods, such as finite element modeling (FEM). FEM requires that the structure to be designed/analyzed be analytically discretized into very small linear "elements." Realistic structures are geometrically complex, as are the loads they are exposed to and the boundary conditions that restrain them. Therefore a considerable amount of effort is required to accurately model the structural response of these realistic structures in the loading environment for which they are expected to perform. An extraordinary amount of knowledge of the structural design details is required a priori (eg. all the local material and geometric properties of the structure, how the skins attach to the spars, what the load paths are, the nonlinearity of the joined regions, how the composite design differs from the "as built" structure, etc). In addition, the models are also only as accurate as the material properties assumed in the analysis. These material properties are usually derived from small (1 in×10 in) uniaxial coupon tests, the results of which are assumed to be appropriate for the three-dimensional structure. The development of FEM models is extremely labor intensive and requires costly experimental validation to ensure that the models accurately reflect reality.

More specifically, for real time loads associated with aircraft wings, the methodology used today relies upon conducting a fairly extensive "strain gage/loads calibration." This method is built upon technology developed in the 1950s and, first, involves the installation of a sparsely distributed number of conventional strain gage sensors located on the inside of the wing structure. An extensive series of tests are then required to apply a matrix of independent concentrated loads to the wing surface to "calibrate' the strain gage response to each particular load applied, called influence coefficients. Software is then used to derive loads equations that can be used in real time using the strain gage measurements as input. The drawback to this method is that it involves a considerable amount of labor and cost to perform these strain gage loads calibrations from installing strain gage instrumentation, to designing and fabricating load system hardware, to assembling the test setup, to conducting the tests, to reducing the data and deriving the loads equations. A fairly elaborate loading system is required to be designed, fabricated, and assembled in order to conduct the tests.

Due to the shortcomings of the current real time, operational loads analysis discussed above, it is desired to provide an improved, real-time, method to calculate operational load data for complex structures, and, more particularly aircraft wings, that significantly reduces time and cost.

SUMMARY OF THE INVENTION

The invention is an improved process for using in-plane surface strain data to obtain real-time, externally applied, out-of-plane operational bending and torsional loads data for complex structures that significantly reduces the time and cost versus current methods.

Accordingly, it is an objective of this invention to provide real-time, externally applied, out-of-plane operational loads data (bending and torsion) for complex structures.

It is another objective of this invention to reduce the time necessary to obtain real-time, externally applied, out-of-plane operational loads data (bending, and torsion) for complex structures.

It is a further objective of this invention to reduce the cost associated with obtaining real-time, operational loads (bending and torsion) for complex structures.

This invention meets these and other objectives related to determining the real-time, operational loads on complex structures by providing an improved method of obtaining said data that significantly reduces the cost and time associated with the current analysis.

In general, the invention comprises installing a very fine, spatially-refined grid of fiber optic sensors on the complex structure to be analyzed. For bending, a single-point load is externally applied to the complex structure at the free end to obtain the bending properties of the complex structure to the "as built" design. Similarly, a single force-couple (moment) is applied at the free end of the structure to obtain torsional structural properties of the complex structure. Because the local bending and torsional stiffness properties of the complex structure can be to determined at every fiber optic sensor location, the output provides similar spatial resolution to that obtained from the more cumbersome, labor-intensive, and costly FEM. All local bending and torsional properties of the complex structure are then input into computationally efficient, highly simplified, and accurate analysis methods to accurately capture the real physical response of the structure without the need for apriori knowledge of the structural details of the complex structure. Finally, the computationally efficient and highly simplified analysis methods are employed during real-time loading of the complex structure in order to, obtain real-time, operational loading data.

This process provides several benefits compared to the current methods described above. First, the complexity of the FEM can be reduced. And, second, a reduced number of degrees-of-freedom are required in this method. These benefits dramatically reduce the time/money required to accomplish the structural analysis and increase the accuracy of the simplified structural models employed.

BRIEF DESCRIPTION OF THE DRAWINGS

In the drawings, which are not necessarily to scale, like or corresponding parts are denoted by like or corresponding reference numerals.

FIG. 2 depicts a cantilever beam with constant cross section under a concentrated load.

FIG. 3 depicts a cantilever beam with tapered cross section subject to tip loading.

FIG. 4 depicts a cantilever beam with constant cross section subject to distributed loading.

FIG. 5 depicts a cantilever beam with tapered cross section subject to distributed loading.

DESCRIPTION OF PREFERRED EMBODIMENTS

Figure 1:
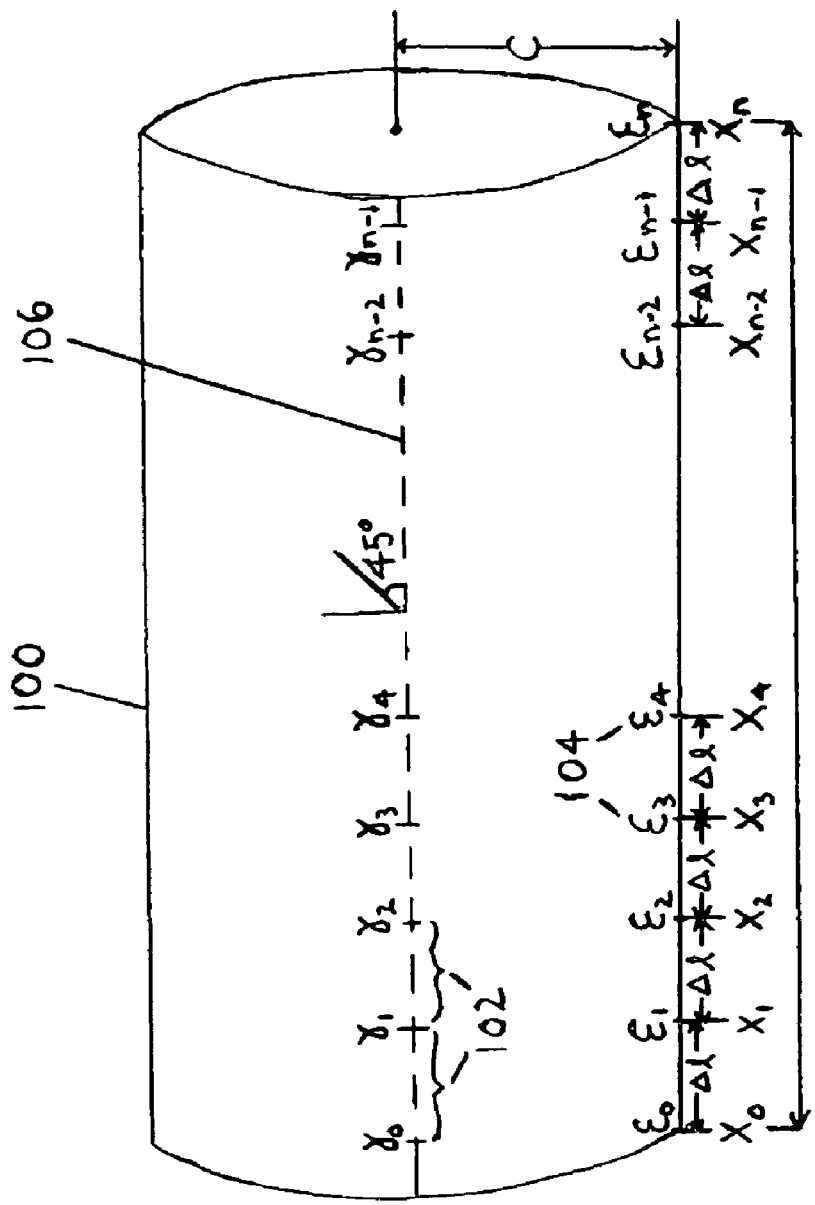
FIG. 1 depicts a structure having a plurality of fiber optic sensors that comprise a plurality of sections.

The present invention is an improved method of using strain data in order to obtain operational loads on complex structures. In general, a plurality of fiber optic sensors are placed on a complex structure, preferably in a grid type, regular pattern. By using fiber optic sensors, a large number of sensors may be employed, due to the small size and weight of the sensors. The sensors, in essence, divide the complex structure into a plurality of sections. The present invention assumes that each of these "sections", which are defined herein as the area from one adjacent fiber optic sensor to another, has a consistent structural behavior within each section, but the structural behavior may be different in different sections. Because the strain is measured at both edges of each section, the section lengths can either be selected to be the same or may vary.

After the fiber optic sensors are installed upon the complex structure, bending and torsional loads can be determined as follows. For the bending load, a single, externally applied point load, with a known force, is applied to the complex structure, normal to the structure's primary axis. Similarly, for torsional loads, a single force couple (moment) at the free end of the structure, with a known magnitude, is applied to the complex, structure. The strain is measured at each fiber optic sensor location and, due to the above discretization of the complex structure into a plurality of sections, closed-form analytical solutions for non-uniform cantilevered beams may be employed to obtain the bending and torsional structural properties of the cross-section of each segment, and, hence, the structural properties of the overall complex, structure. This part of the method of the present invention obviates the need to complete extremely difficult and rigorous finite element modeling of the complex structure.

Next, the complex structure is subjected to operational loading. The light weight and small size of the fiber optic sensors allows for operational loading without significant variance due to sensor equipment. From the structural property information for each section and the strain data obtained from the sensors during operational loading, the bending moment, shear, and loads at each section may be calculated at various time intervals selected by the user.

A more detailed description of the method of the present invention follows for the bending load. An analogous description, can also be shown for the torsional load. As an example of the method for determining bending load, the basic displacement equations will be developed for a complex structure comprising a uniform cantilever beam with constant cross sectional properties. The method is built upon the classical bending equation for the uniform beam $$\frac{d^2 y}{dx^2} = \frac{M(x)}{EI} \quad (1)$$

where y is the vertical displacement, x is the span-wise coordinate, M(x) is the bending moment, E is the Young's modulus (or elastic modulus), and I is the moment of inertia. Equation 1 can be re-written for the non-uniform beam as $$\frac{M(x)}{EI(x)} = \frac{\varepsilon(x)}{c(x)} \quad (2)$$

where $\varepsilon(x)$ is the strain, c(x) is the distance from a strain sensor on the surface of the structure to the neutral axis (which is the half-depth for symmetric sections) both expressed as functions of the span-wise coordinate, x.

Referring to FIG. 1, the spatial domain of the complex structure 100 is discretized by dividing the structure 100 into sections 102 with strain sensing stations i (=0, 1, 2, 3 . . . n) installed at section junctures $x=x_i$ (e.g. station i=0 at $x=x_0=0$ and station i=n at $x=x_n=1$.

Using a simple structure of length, l, and half-depth, c(x), the sections are defined to be $\Delta l(=l/n)$ distances apart.

Equation 2 may be written for each strain, measuring cross-section $x=x_i$ as $$\frac{M_i}{E_i I_i} = \frac{\varepsilon_i}{c} \quad (3)$$

In which the subscript i indicates the values at the strain sensing cross-section $x=x_i$.

Or alternatively, if section modulus is defined as $$S_i = \frac{I_i}{c_i} \quad (4)$$

Then equation 3 becomes $$E_i S_i = \frac{M_i}{\varepsilon_i} \quad (5)$$

The first step in the invention is to install a plurality of fiber optic strain sensors 104 on the complex structure surface 100 in such a way as to measure bending strains at desired locations. In a preferred embodiment of the invention, the fiber optic strain sensors 104 are Fiber Bragg Grating (FBG) sensors. These sensors are preferred because they are minimally obtrusive, ultra-lightweight, easily installed, accurate, immune to EMI, and inherently-safe (no joule heating, sparking). The most preferred configuration and use of FBG sensors for the present invention employ the Optical Frequency Domain Reflectometry (OFDR) technique with hardware architecture described in U.S. Pat. Nos. 5,798,521 and 6,566,648 which are incorporated herein by reference. This approach uses low reflectivity gratings all with the same center wavelength and a tunable laser source. The FBGs are preferably located on a single optical fiber. This allows hundreds of strain sensors to be located down the length of the fiber; a common configuration is to use 480 FBGs on a single 20-ft optical fiber spaced at 1 FBG/cm. This configuration allows strain measurements to be acquired at much higher spatial resolution than other current sensor technologies, making it flexible enough to employ a user-selected grating density depending on the type of application.

The number and spacing of the fiber optic sensors 104 depend upon the overall length of the complex structure 100 as well as the expected variance of the structural properties of the complex structure 100 and may be selected by one skilled in the art. As an example, for an aircraft wing, a user may employ a fiber optic sensor 104 about every half inch.

Referring to FIGS. 1 and 2, the next step is to perform a simple test calibration via a single point load of a known force. For a beam 200 of length, l, discretized into $x_i$ sections 202 each with section lengths of $\Delta l$ and subjected to a tip load of P that places the beam in bending, the flexural rigidity of the beam can be experimentally determined at each measurement location, i. Substituting $M=P(l-\Delta l)$, and solving for bending stiffness $(EI)_i$, equation 3 becomes, $$(EI)_i = \frac{P(l - i\Delta l)c_i}{\varepsilon_i} \quad (6)$$

The product of elastic and section modulus in equation 5 can be determined by calibration at every cross-section by the formula $$(ES)_i = \frac{P(l - i\Delta l)}{\varepsilon_i} \quad (7)$$

In order to obtain operational loads data for the complex structure 200, $\varepsilon$, is measured while the structure 200 is in operation (preferably with the same sensors 204 used during calibration), and (ES), in equation 6 has been determined via a single point calibration, then the bending moment at each station, $M_i$, can then be determined for any general set of loads applied during operation. Equation 3 becomes $$M_i = \frac{(EI)_i \varepsilon_i}{c_i} \quad (8)$$

And equation 5 becomes $$M_i = (ES)_i \varepsilon_i \quad (9)$$

From the equilibrium of moments, the shear loads. $V_i$, at each $x_i$, can then be determined using the following equation $$V_i = \frac{dM}{dx} \cong \frac{\Delta M_i}{\Delta x_i} \quad (10)$$

And subsequently, from equilibrium of forces, the operational loads, $P_i$ can be determined $$P_i = -\Delta V_i \quad (11)$$

The following examples are provided to further illustrate the present invention (note that the following examples employ finite-element analysis in place of experimental results to further demonstrate the invention). Referring to FIG. 2, a cantilever beam with constant cross-section, length l=160 in. and subjected to a concentrated tip load, P, of 1000 lb. is depicted.

Table 1, below, shows the results at each station i obtained from a finite element analysis (FEA) and those calculated using the method of the present invention. FEA results are being used in place of the experimental strains to demonstrate the method of the present invention. The table shows excellent comparison between the flexural rigidity, EI calculated from the following equation $$(EI)_i = \frac{Ebh^3}{12} \quad (12)$$

and from strains generated by FEA input to the equation 6

$$(EI)_i = \frac{P(l - i\Delta l)c_i}{\varepsilon_i} \quad (13)$$

The value obtained from the example analytical "calibration" above is then used along with the strains from FEA to determine the structure's moment, shear, and applied loads, from equations 8, 10, and 11, respectively.

Table 1 further shows that the moment from equation 8 compares well with those computed from $M_i=P(l-x_1)=P[l-i(\Delta x)]=P[l-i(\Delta l)]$.

Table 1 also shows that the shear from equation 10, and the loads from equation 11 compares well with those from statics.

TABLE 1

Results from simulated experimental results (FEA) and the present invention.

| | | | Calibration | | Operation | | | | | |
|---|---|---|---|---|---|---|---|---|---|---|
| index | distance in | strain in/in. | EI calc lbs/in2 | EI FEA lbs/in2 | Moment FEA | Moment Calc | Vi FEA | Vi true Calc | Pi FEA | Pi true Calc |
| 0 | 0 | 9.59280E-05 | 8.33E+09 | 8.34E+09 | 160000 | 160000 | 1000 | 1000 | 0 | 0 |
| 1 | 20 | 8.40010E-05 | 8.33E+09 | 8.33E+09 | 140000 | 140000 | 1000 | 1000 | 0 | 0 |
| 2 | 40 | 7.20000E-05 | 8.33E+09 | 8.33E+09 | 120000 | 120000 | 1000 | 1000 | 0 | 0 |
| 3 | 60 | 6.00000E-05 | 8.33E+09 | 8.33E+09 | 100000 | 100000 | 1000 | 1000 | 0 | 0 |
| 4 | 80 | 4.80000E-05 | 8.33E+09 | 8.33E+09 | 80000 | 80000 | 1000 | 1000 | 0 | 0 |
| 5 | 100 | 3.60000E-05 | 8.33E+09 | 8.33E+09 | 60000 | 60000 | 1000 | 1000 | 0 | 0 |
| 6 | 120 | 2.40000E-05 | 8.33E+09 | 8.33E+09 | 40000 | 40000 | 1000 | 1000 | 0 | 0 |
| 7 | 140 | 1.19960E-05 | 8.33E+09 | 8.34E+09 | 20000 | 20000 | 1000 | 1000 | 0 | 0 |
| 8 | 160 | 6.94000E-07 | 8.33E+09 | 0.00E+00 | 0 | 0 | 1000 | 1000 | -1000 | 1000 |

Referring to FIG. 3, a cantilever beam with a tapered cross-section 300, length l=160 in. and subjected to a tip load, P, of 1000 lb. is depicted.

Table 2, below, shows the results at each station i obtained from the finite element analysis (FEA) and those calculated using the present invention. The table shows excellent comparison between the flexural rigidity, EI calculated from the following equation $$(EI)_i = \frac{Ebh^3}{12} \quad (12)$$

and from strains generated by FEA input to the equation 6

$$(EI)_i = \frac{P(l - i\Delta l)c_i}{\varepsilon_i} \quad (13)$$

The value obtained from the analytical "calibration" above is then used along with the strains from FEA to determine the structure's moment, shear, and applied loads, from equations 8, 10, and 11, respectively.

Table 2 shows that the moment from equation 8 compares well with those computed from $M_i = P[l - i(\Delta l)]$.

TABLE 2

Results from FEA and the present invention.

| | | Calibration | | | Operation | | | | | |
|---|---|---|---|---|---|---|---|---|---|---|
| index | distance in | strain in./in. | EI calc lbs/in2 | EI FEA lbs/in2 | Moment FEA | Moment Calc | Vi FEA | Vi true Calc | Pi FEA | Pi true Calc |
| 0 | 0 | 0.000100269 | 8.33E+09 | 7.98E+09 | 160000 | 160000 | 1000 | 1000 | 0 | 0 |
| 1 | 20 | 0.000115283 | 5.47E+09 | 5.46E+09 | 140000 | 140000 | 1000 | 1000 | 0 | 0 |
| 2 | 40 | 0.000140685 | 3.41E+09 | 3.41E+09 | 120000 | 120000 | 1000 | 1000 | 0 | 0 |
| 3 | 60 | 0.000174987 | 2.00E+09 | 2.00E+09 | 100000 | 100000 | 1000 | 1000 | 0 | 0 |
| 4 | 80 | 0.000222254 | 1.08E+09 | 1.08E+09 | 80000 | 80000 | 1000 | 1000 | 0 | 0 |
| 5 | 100 | 0.000287898 | 5.21E+08 | 5.21E+08 | 60000 | 60000 | 1000 | 1000 | 0 | 0 |
| 6 | 120 | 0.00037428 | 2.13E+08 | 2.14E+08 | 40000 | 40000 | 1000 | 1000 | 0 | 0 |
| 7 | 140 | 0.000440201 | 6.75E+07 | 6.82E+07 | 20000 | 20000 | 1000 | 1000 | 0 | 0 |
| 8 | 160 | 0.000137267 | 1.33E+07 | 0.00E+00 | 0 | 0 | 1000 | 1000 | -1000 | -1000 |

Table 2 also shows that the shear from equation 10, and the loads from equation 11 compares well with those from statics.

Referring to FIG. 4, a cantilever beam with a constant with constant cross-section 400, length l=160 in. and subjected to a distributed load, P, of 800 lb. is depicted.

The value obtained from the analytical "calibration" in Table 1 is then used along with the strains from FEA to determine the structure's moment, shear, and applied loads, from equations 8, 10, and 11, respectively. Table 3 shows that the loads from equation 11 compares well with the applied as shown in FIG. 3.

TABLE 3

Results from FEA and the present invention.

| | Operation | | |
|---|---|---|---|
| Strain FEA in./in. | Moment lb-in | Vi lb | Pi lb |
| 0.00034574 | 576671 | 7300 | -891 |
| 0.00026909 | 448485 | 6409 | -809 |
| 0.00020189 | 336483 | 5600 | -800 |
| 0.00014429 | 240483 | 4800 | -800 |
| 0.00009629 | 160483 | 4000 | -800 |
| 0.00005789 | 96483 | 3200 | -800 |
| 0.00002909 | 48483 | 2400 | -800 |
| 0.00000989 | 16485 | 1600 | -776 |
| 0.00000055 | 0 | 824 | -824 |

Referring to FIG. 5, a cantilever beam with a tapered cross-section 500, length l=160 in. and subjected to a distributed load of 800 lb. is depicted. The value obtained from the analytical "calibration" in Table 2 is then used along with the strains from FEA to determine the structure's moment, shear, and applied loads, from equations 8, 10, and 11, respectively.

Table 4 shows that the loads from equation 11 compares well with the applied as shown in FIG. 5.

TABLE 4

Results from FEA and the present invention.

| | Operation | | |
|---|---|---|---|
| Strain FEA in./in. | Moment lb-in | Vi lb | Pi lb |
| 0.000361084 | 576184 | 7300 | -899 |
| 0.000369048 | 448173 | 6401 | -806 |
| 0.000394251 | 336284 | 5594 | -799 |
| 0.000420633 | 240380 | 4795 | -800 |
| 0.000445818 | 160472 | 3995 | -800 |
| 0.000463328 | 96561 | 3196 | -800 |
| 0.000455266 | 48655 | 2395 | -801 |
| 0.000369174 | 16773 | 1594 | -755 |
| 0.000109789 | 0 | 839 | -839 |

What is described are specific examples of many possible variations on the same invention and are not intended in a limiting sense. The claimed invention can be practiced using other variations not specifically described above.

What is claimed is:

1. A method of performing real-time, operational loads monitoring of a complex structure, comprising the steps of:
    installing a plurality of fiber optic strain sensors on a surface of the complex structure;
    applying an external single-point load, of known force to the complex structure and obtaining a strain measurements at each of the fiber optic strain sensors;
    calculating the structural properties of the complex structure between each fiber optic strain sensor from the strain data obtained at each fiber optic strain sensor; and,
    using the structural properties and the strain measured at each fiber optic strain sensor during operational loading to obtain real-time operational loads on the complex structure.

2. The method of claim 1, wherein the calculating the structural properties step further comprises inputting the measured strain of adjacent fiber optic strain sensors into closed-form, uniform structure algorithms.

3. The method of claim 2, wherein the algorithms are selected from those to determine bending, torsion, or both for the complex structure between adjacent fiber optic sensors.

4. The method of claim 3, wherein the calculating the structural properties step further comprises calculating the elastic modulus and a section modulus between each of the fiber optic sensors.

5. The method of claim 4, wherein the using the structural properties and the strain step further comprises, calculating the bending moment between adjacent fiber optic sensors during operational loading by multiplying the elastic modulus by the section modulus from the calculating the structural properties step and further multiplying the strain from operational loading.

6. The method of claim 5, wherein the using the structural properties and the strain step further comprising calculating the shear loads between adjacent fiber optic sensors from equilibrium of the operational loading bending moments.

7. The method of claim 6, wherein the using the structural properties and the strain step further comprises calculating the operational loads between the adjacent fiber optic sensors from equilibrium of forces of the shear loads.

8. The method of claim 1, wherein the structural properties comprise bending and torsional stiffness.

9. The method of claim 1, wherein the known force comprises a single-point load for bending.

10. The method of claim 1, wherein the known force comprises an external force-couple for torsion.

* * * * *